P. R. MANSFIELD.
Feed and Delivering Aprons.
No. 137,224.            Patented March 25, 1873.
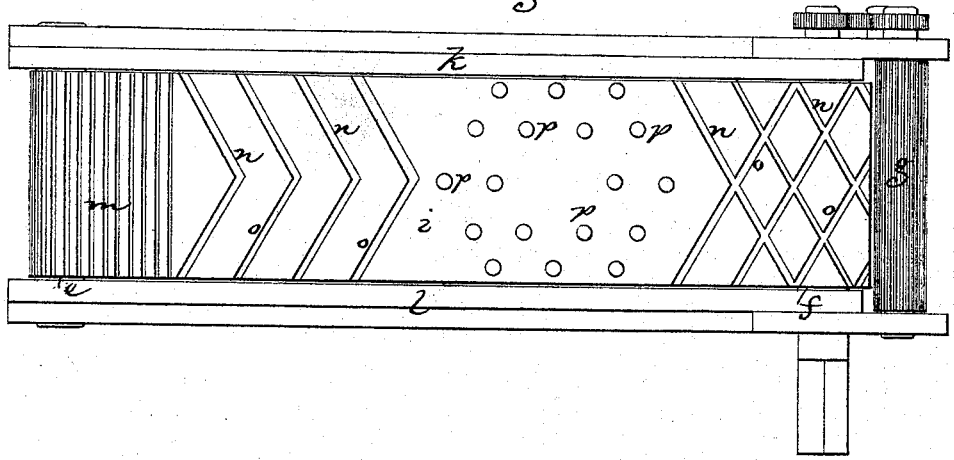
Witnesses,
M. W. Frothingham,
L. H. Latimer,
Inventor.
Preston R. Mansfield,
By his Attys.
Crosby & Gould

UNITED STATES PATENT OFFICE.

PRESTON R. MANSFIELD, OF LANCASTER, MASSACHUSETTS.

IMPROVEMENT IN FEED AND DELIVERY APRONS.

Specification forming part of Letters Patent No. 137,224, dated March 25, 1873.

*To all whom it may concern:*

Be it known that I, PRESTON R. MANSFIELD, of Lancaster, in the county of Worcester and State of Massachusetts, have invented an Improved Feed and Delivery Apron for Machines used in the Preparation of Fiber; and I do hereby declare that the following, taken in connection with the drawing which accompanies and forms part of this specification, is a description of my invention sufficient to enable those skilled in the art to practice it.

In the feed of fibrous matter to mechanism used in the preparation thereof for the subsequent action of other machinery employed in textile manufactures, and in delivering fibrous matter from such machines, it is customary to use feed and delivery aprons made with wooden slats or bars to facilitate the movement of the fibers, the aprons being generally made of two or more leather bands, to and across which the slats are nailed. Such slats are objectionable for various reasons. They are rigid and unyielding; they splinter and catch and accumulate the fibers; they become wholly or partially detached while the machine is running; and, when several belts are used with slats nailed across the belts, they soon fail to run uniformly, and are drawn into contact with the guards between which the belts run. Moreover, the splinters from the slats mix and unite with the fiber of the lap, and are drawn into the carding machinery, where they injure the card-clothing.

The primary object of my invention is to obviate these and other defects arising from the use of such imperfect feed or delivery aprons. To accomplish this result I form the belt of a rubber and cloth compound, (or rubber-belting material,) and stretch such belt (which is more or less elastic) around the rolls over which it is to run, and upon this elastic belt I form ribs, grooves, spurs, or projections, which partake of the flexibility of the belt and insure the feed of the material laid upon it. These ribs or projections I form upon and as integral parts of the belt in the process of making it. Preferably they are formed in making the apron by laying strips of rubber cloth or other material upon a long strip of rubber cloth, (across the same,) then laying another long strip of rubber cloth over these cross-strips, and then vulcanizing the whole together in a suitable mold or by suitable pressure. The grooves, ribs, or protuberances yield freely in every direction, as a part of the flexible and elastic band, and form perfectly reliable and enduring feeding-surfaces, which cannot break or splinter, or become dislodged, or partially dislodged, from the belt, which will freely feed the material along, and which will not entangle or accumulate the fiber, but will freely deliver it to the rolls located to receive it, or to any mechanism or receptacle designed to take it from the conductor.

The drawing represents an apron embodying my invention.

Figure 1 shows, in cross-section, an apron embodying my construction. Fig. 2 is a section of part of such apron, and shows the feed ribs or projections in cross-section. Fig. 3 is a plan of an apron and feed-rolls, and the conductor in which the apron travels.

In the apron shown in Figs. 1 and 2, a piece of rubber cloth or belting, $a$, has laid upon it a series of cross-pieces, $b$, made up of strips of rubber cloth or compound, or of other suitable flexible material, and over these pieces is laid another sheet of rubber cloth or belting material, $c$, and then the whole are vulcanized together by heat and pressure; and, by the use of suitable dies or other appliances, the outer pieces $a$ $c$ are brought together between the pieces $b$, so that the belt in section is of the form shown in Fig. 2, the pieces $b$ causing the formation of the ribs $d$. The piece $c$ is preferably of a width greater than the length of the pieces $b$, and the piece $a$ of still greater width, so that its edges may be turned over the edge of the piece $c$ to impart smooth or selvage edges to the belt and strengthen it at the edges. The belt thus made is stretched upon the rollers in connection with which it runs, and the ribs form feeding projections, which operate with perfect freedom, never clog, break, or become detached, and afford no crevices with which the fibers can become entangled.

In Fig. 3 I show a belt stretched around rolls $e f$, and arranged to deliver material to feed-rolls $g g$, the belt $i$ occupying the full width between the side walls $k l$ of the conductor. Upon this belt, which, like the belt $a c$, is formed of rubber belting or cloth, I show feeding devices formed in various ways, as by making grooves *m* by cutting into the surface of the belt and removing material therefrom, by forming diagonal grooves *n o*, and by attaching pieces *p* to form protuberances. Strips may be similarly attached, or grooves or depressions may be formed by pressure instead of by attachment.

I claim—

An elastic feed or delivery apron made of a strip, *a*, rib-forming fillings *b*, and covering-strip *c*, the edges of strip *a* lapping the edges of strip *c*, and the whole being vulcanized together, substantially as shown and described.

PRESTON R. MANSFIELD.

Witnesses:
 FRANCIS GOULD,
 M. W. FROTHINGHAM.